T. W. JOHNSTON
Car-Starters.
No. 140,781. Patented July 15, 1873.
Fig I
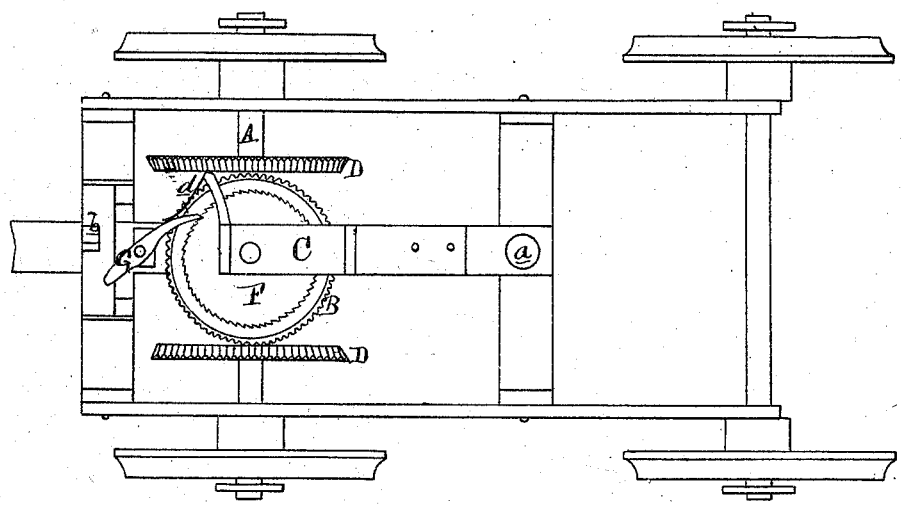
Fig II
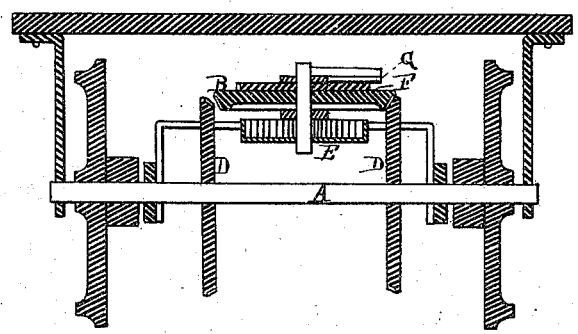
Attest
H. J. Sprague
H. F. Eberts
Inventor
Thos. W. Johnston
By Atty
Thos. J. Sprague

UNITED STATES PATENT OFFICE.

THOMAS W. JOHNSTON, OF CHICAGO, ILLINOIS.

IMPROVEMENT IN CAR-STARTERS.

Specification forming part of Letters Patent No. 140,781, dated July 15, 1873; application filed March 27, 1873.

*To all whom it may concern:*

Be it known that I, THOMAS W. JOHNSTON, of Chicago, in the county of Cook and State of Illinois, have invented a new and useful Improvement in Device for Stopping and Starting Horse-Cars; and I do declare that the following is a true and accurate description thereof, reference being had to the accompanying drawings and to the letters of reference marked thereon and being a part of this specification, in which—

Figure 1 is a plan view of my invention, and Fig. 2 is a vertical cross-section taken on a line through the center of the axle.

Like letters indicate like parts in each figure.

This invention has for its object the construction of an attachment to cars used on street or horse railways, by means of which such cars may be stopped when desired, thereby avoiding the necessity and wear of brakes as ordinarily employed, and so arranged that in gradually stopping a power will be stored which will be available in starting the car again, thereby avoiding the sudden and violent strain on the shoulders of the horses which invariably follows starting a loaded car. The invention consists in the peculiar arrangement of the various parts, as more fully hereinafter described.

In the accompanying drawings, A represents one of the axles of a car, to which is rigidly secured the two bevel or miter cogged wheels D; and B is a similar miter-wheel properly journaled to the horizontal lever C pivoted at one end, at $a$, and so arranged that by shifting the opposite end the wheel B can be thrown into gear with one or the other of the wheels D, as may be desired. To the journal of the wheel B is secured a coil-spring inclosed in a case, E, and so arranged that as wheel B rotates in one direction it will wind up said spring. A ratchet-wheel, F, is secured to the wheel B, and a pawl, G, prevents said wheel from being rotated by the uncoiling of the spring, except when the pawl is disengaged. While the lever C has a central position all the miter-wheels will rotate clear of each other or run without contact, but when the driver wishes to stop his car the lever may be thrown to one side by any convenient device not shown or claimed, so that the wheel B will engage with the proper one of the wheels D, when the momentum of the car will wind up the spring, which action will stop the car. When he desires to start he returns the lever past its central position, when the wheel B will engage with the other wheel D, and at the same moment the pawl should be disengaged by the outer end thereof being brought into contact with the stop $b$. By the reversal of the lever the spring will uncoil, communicating, through the means described, a forward motion to the axle and at once starting the car. In the same way power may be stored on a descending grade to assist on an upward grade. A spring, $d$, is employed to compel the pawl to engage with the ratchet, except when the same is forcibly disengaged, as hereinbefore described.

What I claim as my invention, and desire to secure by Letters Patent, is—

The pivoted lever C having attached thereto the case E with inclosed spring, ratchet-wheel F, gear-wheel B, and spring-pawl G, in combination with the wheels D D rigidly affixed to the axle A, and stop $b$, as described, for the purpose set forth.

THOMAS W. JOHNSTON.

Witnesses:
WM. H. LOTZ,
EMIL HARKER.